United States Patent [19]
Pailles et al.

[11] Patent Number: 5,128,997
[45] Date of Patent: Jul. 7, 1992

[54] WIRED MICROCIRCUIT CARD AND A METHOD FOR TRANSACTIONS BETWEEN A CORRESPONDING WIRED MICROCIRCUIT CARD AND A TERMINAL

[75] Inventors: Jean-Claude Pailles, Epnon; Marc Girault, Caen, both of France

[73] Assignee: Centre National d'Etudes des Telecommunications, Issy les Moulineaux, France

[21] Appl. No.: 554,122

[22] Filed: Jul. 17, 1990

[51] Int. Cl.⁵ .............................................. H04K 1/00
[52] U.S. Cl. ...................................... 380/23; 235/380; 380/25
[58] Field of Search ........................ 380/23, 24, 25; 235/380–382.5

[56] References Cited

U.S. PATENT DOCUMENTS

| | | | |
|---|---|---|---|
| 4,985,921 | 1/1991 | Schwartz | 380/24 |
| 5,001,752 | 3/1991 | Fischer | 380/23 |
| 5,003,594 | 3/1991 | Shinagawa | 380/24 |

FOREIGN PATENT DOCUMENTS

| | | |
|---|---|---|
| 0037762 | 10/1981 | European Pat. Off. . |
| 0193920 | 9/1986 | European Pat. Off. . |
| 0241379 | 10/1987 | European Pat. Off. . |
| 0250309 | 12/1987 | European Pat. Off. . |
| 0252849 | 1/1988 | European Pat. Off. . |
| 2606909 | 5/1987 | France . |

*Primary Examiner*—Thomas H. Tarcza
*Assistant Examiner*—David Cain
*Attorney, Agent, or Firm*—Toren, McGeady & Associates

[57] ABSTRACT

The invention concerns a microcircuit card of the kind comprising:
- a communication interface;
- an internal memoryp
- a wired processor unit allowing this internal memory to be addressed from the outside.

According to the main characteristic of the invention, provision is made for a secret internal memory zone not addressable from the outside, and the processor unit comprises a wired circuit capable of using the contents of the secret memory for establishing a first serial cryptographic function of two operands and means reacting to the interrogation of predetermined addresses of the internal memory, accompanied by a keyword by applying this keyword and the output of the internal memory as operands of the wired circuit, whilst the output of the wired circuit is applied to the interface.

28 Claims, 8 Drawing Sheets

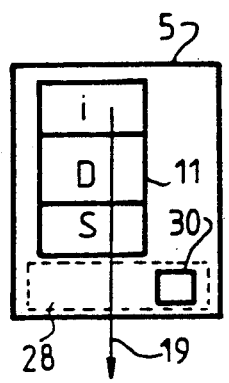 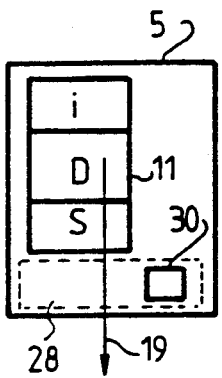 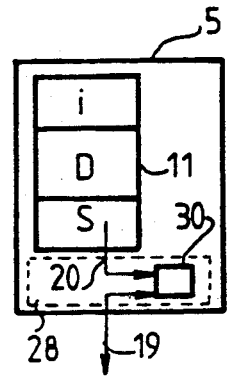 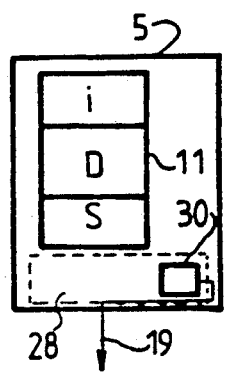
FIG. 6a  FIG. 6b  FIG. 6c  FIG. 6d
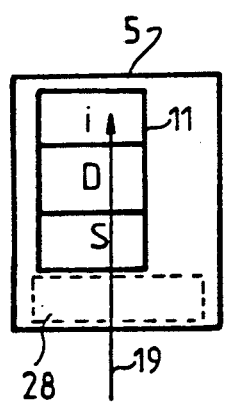 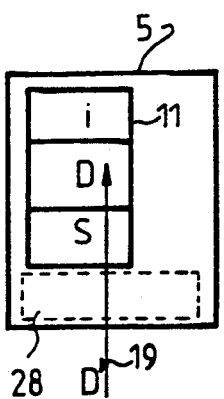 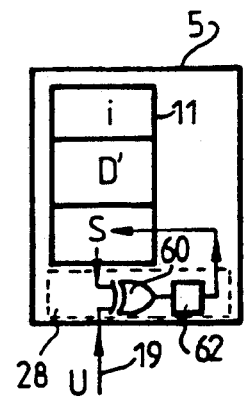 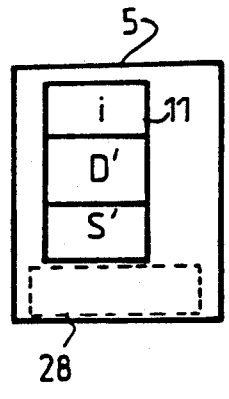
FIG. 7a  FIG. 7b  FIG. 7c  FIG. 7d

WIRED MICROCIRCUIT CARD AND A METHOD FOR TRANSACTIONS BETWEEN A CORRESPONDING WIRED MICROCIRCUIT CARD AND A TERMINAL

FIELD OF INVENTION

The invention concerns the technical field of wired microcircuit cards, that is to say, memory cards without a microprocessor.

More particularly, the invention concerns the execution of transactions between a wired microcircuit card and a terminal, such as the execution of monetary, commercial and financial transactions.

PRIOR ART

Generally, wired microcircuit cards comprise an interface for communication with a terminal, an internal memory and a very simple wired processor unit making it possible to address the internal memory from the outside.

Whereas, a microprocessor generally is made up of a RAM, A ROM either an EEPROM or EPROM, and a CPU, a simple wired processor does not have a CPU and RAM.

Taking into account the fact that they are inexpensive, because of the absence of any microprocessor, wired microcircuit cards have quickly found many applications, in particular, the cards known as "phonecards", of the prepaid kind, operating in France with public telephones. In such termed prepaid cards, each memory bit has a predetermined value. As indicated by its name, the holder of such a card pays for its equivalent value before using it.

Nowadays, prepaid cards are suitable for wider applications than these phonecards, with the result that the cards are made into an electronic purse or wallet.

One of the problems then encountered is to protect the wired microcircuit card, taking into account that it is easy to subject the memory bits, to which a certain value has been allocated, to fraud.

One of the solutions for this problem lies in providing the card with means for authenticating the card, as well as its content. Now, a conventional operation of such means requires reliance on expensive techniques such as micro-processor-based logic programs which restrict the widespread use of such cards by increasing their unit price.

OBJECTS OF THE INVENTION

It is a first object of the invention to provide a solution for this latter problem.

It is another object of the invention to protect a wired microcircuit card against fraudulent copying in a simple and inexpensive way and to safeguard the transaction between a wired microcircuit card and a terminal.

It is yet another object of the invention to provide a wired microcircuit card with wired electronic means that are simple and inexpensive to operate, making it possible to prevent fraudulent copying of the card and to authenticate the contents of the said card (that is to say, prevent the fraudulent manufacture of false cards).

Another object of the invention is to safeguard the transactions between a wired microcircuit card and a terminal, mainly during the authentication or validation of the card before the transaction and during the updating of the card after the transaction.

SUMMARY OF THE INVENTION

Thus the invention concerns a microcircuit card of the type comprising:
 a communication interface;
 an internal memory; and
 a wired processor unit allowing this internal memory to be addressed from the outside.

According to a general definition of the invention, provision is made for a secret internal memory zone not addressable from the outside, whilst the processor unit comprises a wired circuit capable of using the contents of the secret memory for establishing a first serial cryptographic function of two operands, and means reacting to the interrogation of prede- termined addresses of the memory accompanied by a keyword by applying this keyword and the output of the internal memory as operands of the wired circuit, while the output of the wired circuit is applied to the interface.

According to another aspect of the invention, the wired circuit comprises
 first logic operator receiving the keyword and the output of the internal memory;
 a retardation logic circuit having retardation means forming a loop between the outputs and the inputs of the addresses of the secret memory with the intervention of input means receiving the output of the first operator, as well as the outputs of the retardation means, whilst the retardation logic circuit comprises moreover output means receiving the outputs of the retardation means and whose output provides the output of the wired circuit.

In practice, the input means comprise:
 a second logic operator receiving on the one hand the output of the first operator, and on the other hand, an output of the retardation means, at least this second operator being of the binary equiprobable type, such as an EXCLUSIVE OR gate.

In practice, the retardation means comprise a plurality of loop-mounted flip-flops between the outputs and the address inputs of the secret memory, at least one of the flip-flops receiving the output of the second logic operator which itself receives on the one hand the output of the first operator and on the other hand an output of the secret memory, whilst one of the flip-flops provides the output of the wired circuit.

Advantageously, the two logic operators are of the EXCLUSIVE OR type.

In accordance with a preferred embodiment of the invention, the keyword is a variable coming from the interface.

According to another aspect of the invention, the internal memory comprises:
 identification bits of the card;
 value bits to which there is assigned a unit value that can be used up by writing thereon; and
 signature bits of the card.

It is an important characteristic of the invention that the signature bits of the card are the result of an encoding by a second secret cryptographic function outside the card and having the output of the internal memory as the operand.

In practice, the identification bits and the value bits are the operands of the second cryptographic function.

In one embodiment of the invention, the internal memory is a memory with a permanent EPROM type electrically non-erasable entry mode.

In another embodiment of the invention, the internal memory is a memory with a permanent EEPROM type erasable and electrically renewable entry mode.

Advantageously, the secret memory zone is a permanent-entry memory, for example of the PROM type, having a fixed binary content.

The invention also relates to a transaction method between at least one terminal and at least one wired microcircuit card capable of cooperating with this terminal.

According to a general definition of the method in accordance with the invention, the method comprises the following steps:

a) providing the card:
   with a communication interface,
   with an internal memory,
   with a wired processor unit allowing this internal memory to be addressed from the outside;

b) making provision in the card for an internal secret memory
   zone not addressable from the outside;

c) prestoring in the card:
   identification bits of the card;
   value bits to which there is allocated a unit value that can be used up by writing thereon; and
   signature bits of the card;

d) providing the processor unit of the card with a wired circuit capable of using the contents of the secret memory for establishing a first serial cryptographic function of the two operands;

e) during a validation request for a transaction assumed to be coming from the card,
   e1) receiving at the terminal the output of the internal memory;
   e2) providing the terminal with means capable of generating a keyword;
   e3) transmitting the keyword from the terminal;
   e4) calculating in the card, the transform of the keyword and of the output of the internal memory by the first cryptographic function;
   e5) receiving from the card the said transform obtained by the first cryptographic function;
   e6) calculating at the terminal the transform of the keyword and of the output of the internal memory obtained by the first cryptographic function;
   e7) deciding the validation according to the comparison of the transform received from the card and the transform calculated by the terminal.

In practice, in the card, the signature bits serve together with the keyword as the operands for the first cryptographic function.

Advantageously, the signature bits are the transform of a second secret cryptographic function outside the card, and having the output of the internal memory as operand, for example the identification bits and the value bits.

According to a preferred implementation of the method in accordance with the invention, the method also comprises providing the terminal with means capable of executing a second cryptographic function having the output of the internal memory as operand, for example the identification bits and value bits, whilst during a validation request for a transaction, step e1) comprises moreover, the following step:

e11) calculating at the terminal the transform of the output of the internal memory, for example the identification bits and the value bits, by means of the second cryptographic function to obtain the signature bits;

whilst step e6) lies in calculating at the terminal the transform of the first cryptographic function having as operands the keyword, as well as the transform of the second cryptographic function, that is to say the signature bits.

The expert will understand that the method for transactions between a terminal and a card in accordance with the invention is safeguarded in particular by means of the second cryptographic function which is specific to the terminal and which allows the card to be signed without any exchange between the terminal and the card of the signature bits in an unencoded form.

According to another preferred implementation of the method in accordance with the invention, wherein the card with the wired microcircuit holds at least value bits having a predetermined value intended to be processed by the terminal to validate the transaction according to chosen criteria, the method comprises the following steps after the transaction has been concluded;

a) obtaining at the terminal the value bits after the transaction;

b) comparing at the terminal the value bits after the transaction with the value bits before the transaction;

c) if the value bits after the transaction exceed the value bits before the transaction, calculating at the terminal the transform of the identification bits and of the value bits after the transaction by the second cryptographic function;

d) displacing the transform thus calculated by the second cryptographic function by a binary element according to a circular permutation;

e) obtaining an intermediate coded signal by the EXCLUSIVE OR sum of the transform obtained by the second cryptographic function calculated before the transaction and of the transform by the second cryptographic function calculated after the transaction, itself displaced according to the circular permutation;

f) transmitting from the terminal the identification bits and the value bits after the transaction;

g) transmitting from the terminal the intermediate encoded signal;

h) entering the identification bits and the value bits after the transaction into the memory;

i) storing in the card the EXCLUSIVE OR sum of the signature bits before the transaction and of the intermediate coded signal;

j) entering into the memory the signature bits after the transaction by means of the said EXCLUSIVE OR sum thus stored.

A first variant of the method in accordance with the invention, wherein the memory is managed like an abacus, makes provision for calculating the transform by the first cryptographic function with the keyword as the first operand and with the value bits and the signature bits as the second serial operand.

This variant also makes provision for a mode of reloading the card in case the value bits are used up, this variant of the method comprising the following steps:

a) setting the identification bits, the value bits and the signature bits to zero before the reloading, b) incrementing a reloading counter; and c) reloading the new identification bits, value bits and signature bits into the card.

A second variant of the method in accordance with the invention wherein the memory is managed according to a binary counter, makes provision for updating the value bits after the transaction, comprising the following steps:
 a) transmitting from the terminal the bits representing the amount of the transaction;
 b) comparing the bits representing the amount with the value bits;
 c) subtracting the bits representing the amount from the value bits;
 d) positioning an indicator according to the subtraction sign.

BRIEF DESCRIPTION OF THE DRAWINGS

Other characteristics and advantages of the invention will emerge on examining the detailed description given below, and the attached drawings wherein:

FIGS. 6 to 6d illustrate the steps relating to the validation of a card provided with an EEPROM memory before the transaction, whilst FIGS. 7 to 7d illustrate the steps relating to the updating of such a card after the transaction;

DETAILED DESCRIPTION OF THE PREFERRED EMBODIMENT

The attached drawings are, in essence, of a definite nature. They therefore form an integral part of the description and they serve not only to provide a better understanding thereof, but also to contribute to the definition of the invention if required.

Figure 1:
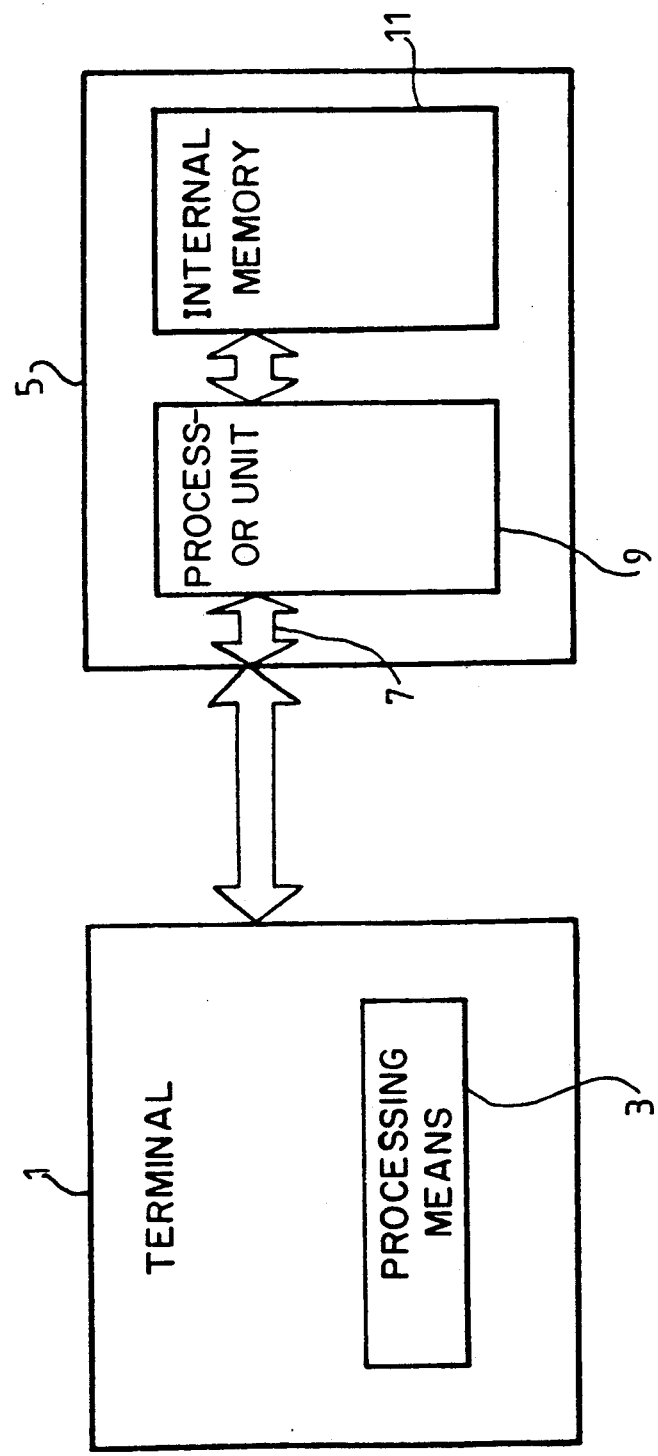
FIG. 1 illustrates one embodiment of a transaction system allowing the invention to be implemented.

In FIG. 1, a terminal 1 provided with processing means 3 is interacting with a wired microcircuit card 5 having a communication interface 7, an internal memory 11 and a wired processor unit 9 allowing this internal memory to be addressed from the outside.

The internal memory 11 is, for example, a memory of the EPROM type with permanent electrically non-erasable entries. As a variant, it may be a memory with permanent electrically erasable and renewable entries, that is to say, of the EEPROM type, sometimes designated as e²PROM.

These are the main card types presently available on the market.

The memories that can be used in accordance with the invention are electrically programmable dead memories wherein this electrically actuated programming operation corresponds to the permanent entry defined above. In a prepaid card, an unwritten bit will be allocated a unit value that will be used up by the writing of this bit.

The reprogramming of the card presupposes that one should be able to erase it. Only the e²PROM memories are electrically erasable. For their part, the EPROM technology memories would only be erasable by other means, such as ultraviolet radiation.

Figure 2:
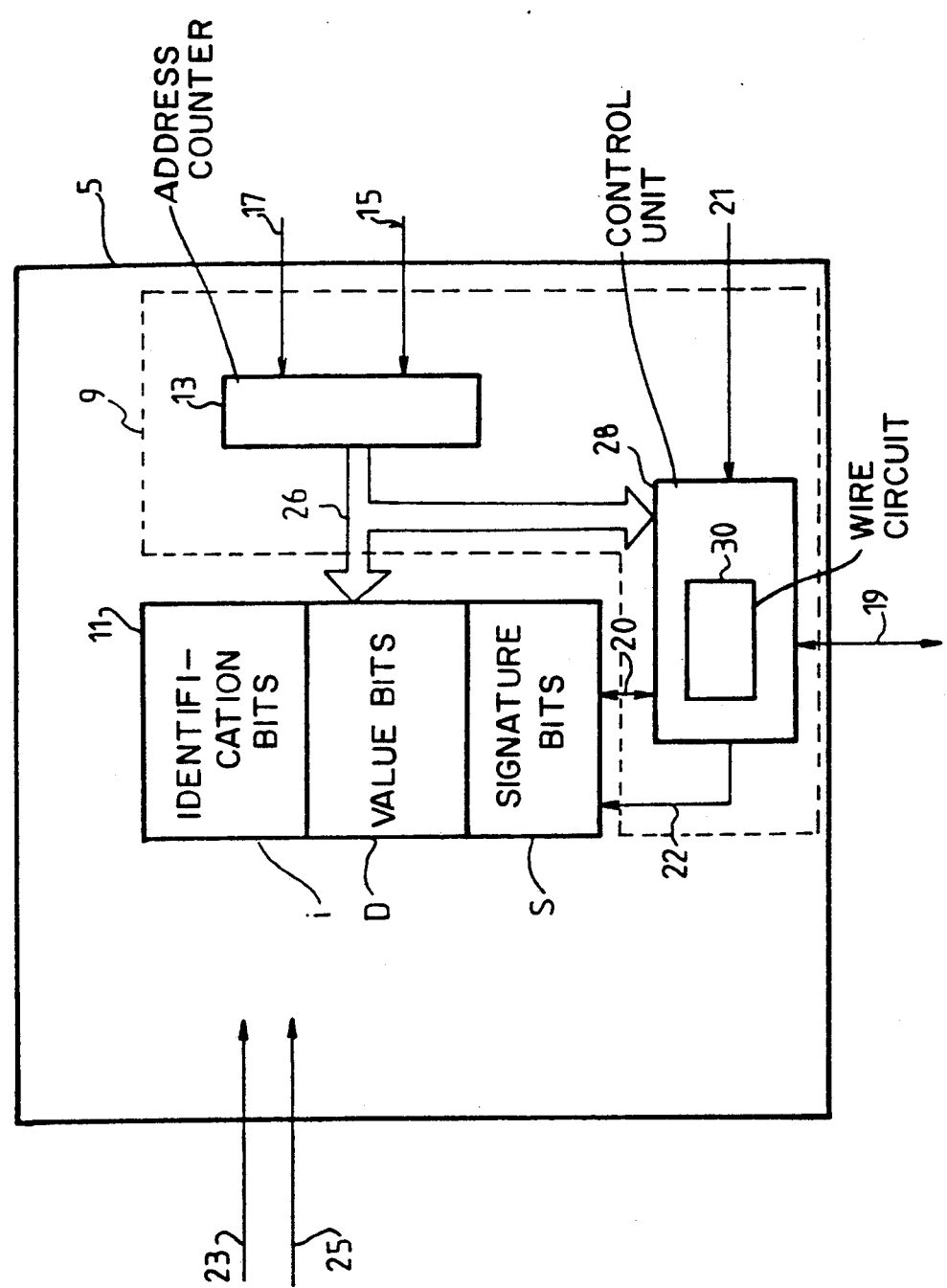
FIG. 2 is a diagram illustrating the structure of a wired microcircuit card in accordance with the invention.

FIG. 2 schematically shows the structure of a wired micro-circuit card in accordance with the invention. The internal memory 11 contains for example 256 bits addressed by an address counter 13 via an address bus 26. The counter 13 is of the 8 bit type and it is reset to zero by a zero resetting signal 15. The address bus 26 is applied to a control unit 28 which ensures the functions of controlling and switching the memory 11. The memory 11 is a serial memory read or written at the rate of a clock signal 17 on the input-output wire 19 of the control unit 28. The read/write signal 21 of the control unit 28 allows the reading or writing mode to be selected. The clock signal 17 comes from the terminal 1. The card 5 is energized by a feeder signal 23, while it is earthed by the line 25. An input/output line 20 connects the internal memory 11 to the control unit 28 which, in accordance with the invention, has a wired circuit 30 described in greater detail below, while a control line 22 coming from the control unit 28 is connected to the memory 11.

The memory 11 comprises bits i for the identification of the card, and value bits D whereto there is allocated a unit value that can be used up by writing, and signature bits S of the card.

For example, the identification bits i are stored in 64 bits at addresses ranging from A0 to A63, the value bits D are stored in 128 bits at addresses ranging from A64 to A191, whilst the signature bits S are stored in 64 bits at addresses ranging from A192 to A255.

Figure 3:
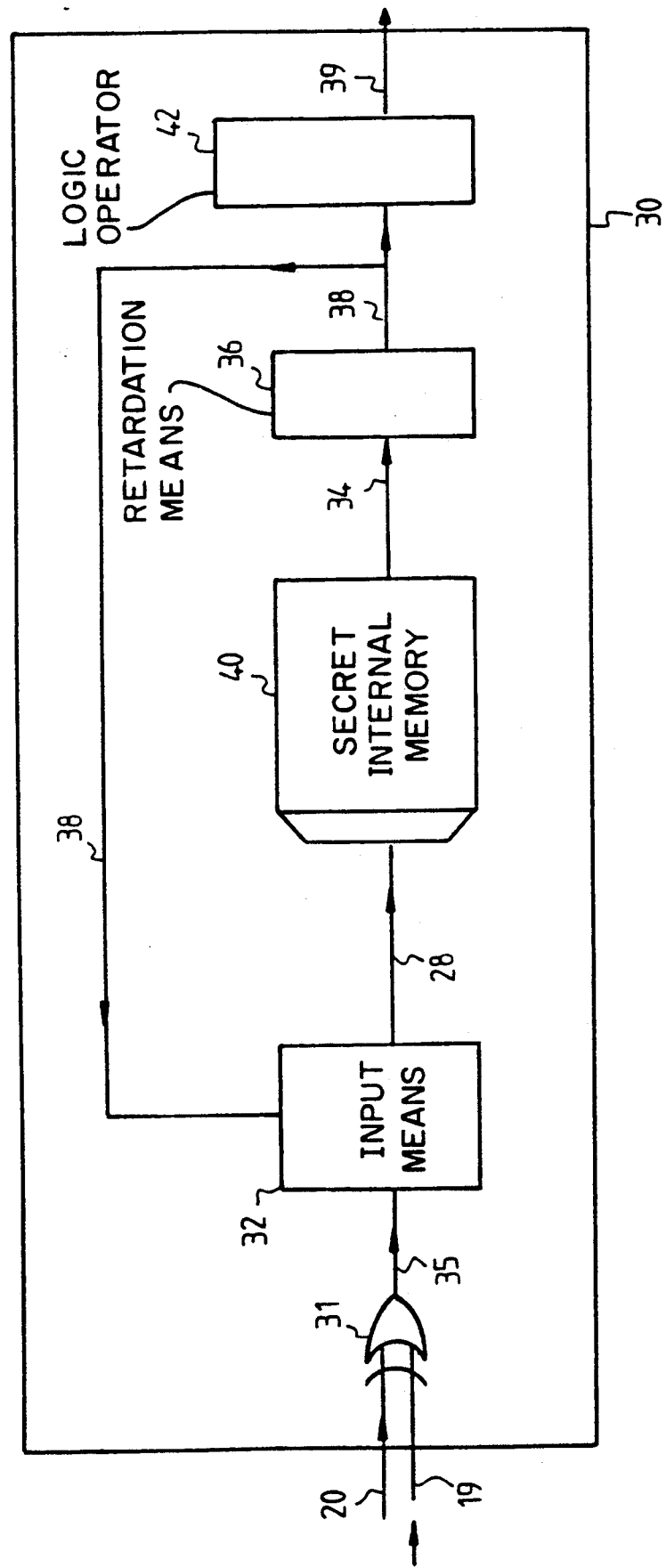
FIG. 3 is a general diagram of the wired circuit in accordance with the invention.

FIG. 3 shows a wired circuit 30 which is an essential element of the invention. It comprises a first logic operator 31 of the EXCLUSIVE OR type receiving two operands coming respectively from the input/output line 19 of the card and the input/output line 20.

The wired circuit 30 has a secret internal memory 40 non-addressable from the outside. For example, the memory 40 is of the PROM type having four binary address elements and 16 words of four binary elements, that is to say, a capacity of 64 binary elements.

The wired circuit 30 finally comprises a retardation logic circuit having retardation means 36 and forming a loop between the outputs 34 and address inputs 28 in 4 bits of the secret memory 40, with the intervention of input means 32 receiving on the one hand the output 35 of the first operator 31, and on the other hand the outputs 38 from the retardation means 36. The outputs 38 of the retardation means 36 are also applied to an output logic operator 42. The output 39 of the logic operator 42 provides the output of the wired circuit 30 which is itself connected to the input/output line 19 of the card.

Figure 4:
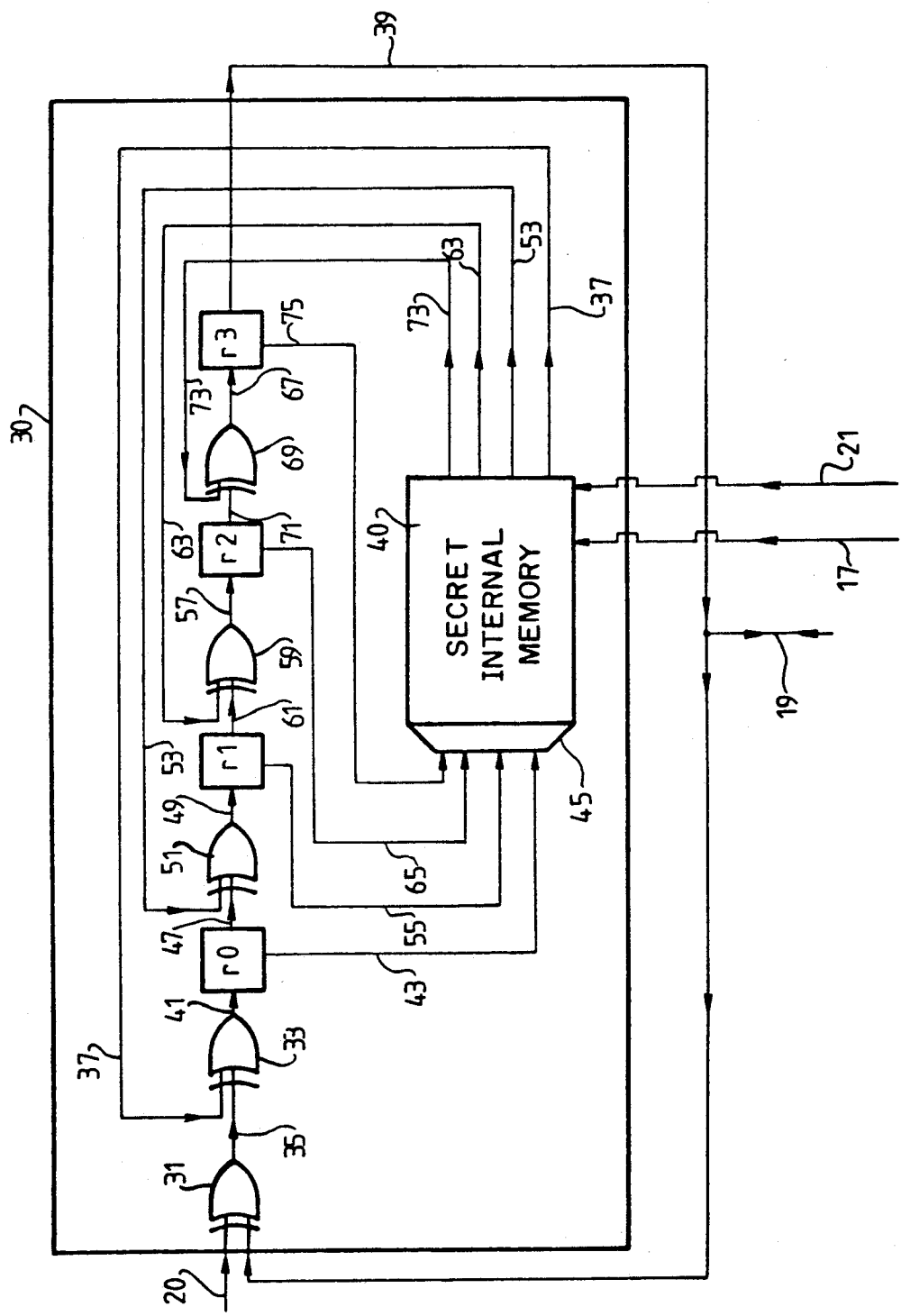
FIG. 4 is a detailed diagram of an example of the operation of the wired circuit making it possible to establish the first cryptographic function in accordance with the invention.

FIG. 4 shows an embodiment of the retardation means 36 described with reference to FIG. 3. The input means are constituted by a second logic operator 33 of the EXCLUSIVE OR type receiving on the one hand the output 35 of the first operator 31, and on the other hand an output 37 from the secret memory 40.

The retardation means 36 are constituted by a plurality of flip-flops R. Insofar as the secret memory 40 has four binary address elements, the retardation means 36 have four flip-flops specified at R0 to R3, mounted in a loop between the outputs and address inputs of the secret memory 40. More precisely, the flip-flop R0 receives the output 41 of the second logic operator 33. One of the outputs 43 of the flip-flop R0 is connected to the address decoder 45 of the secret memory 40.

The flip-flop R1 receives the output 49 of a third EXCLUSIVE OR type logic operator 51 receiving on the one hand, the other output 47 of the flip-flop R0 on the one hand, and the output 53 of the secret memory 40 on the other hand. One of the outputs 55 of the flip-flop R1 is connected to the address decoder 45 of the secret memory 40.

The flip-flop R2 receives the output 57 of a fourth EXCLUSIVE OR type logic operator 59 receiving the other output of the flip-flop R1 on the one hand, and an output 63 of the secret memory 40 on the other hand. One of the outputs 65 of the flip-flop R2 is connected to the address decoder 45 of the secret memory 40.

The flip-flop R3 receives the output 67 of a fifth EXCLUSIVE OR type logic operator 69 receiving the other output of the flip-flop R2 on the one hand, and the output 73 of the secret memory 40 on the other hand. One of the outputs 75 of the flip-lop R3 is connected to the address decoder 45 of the secret memory 40.

The other output 39 of the flip-flop R3 performing the function of the output means 42 is connected to the input/output line 19 of the card 5, itself connected to the communication interface i of the card.

The flip-flops R0 to R3 are, for example, D type flip-flops

Here one is, of course, concerned with an example of operating a wired circuit suitable for a secret memory addressable over 4 bits. It is obvious that the number of flip-flops R could be different for a secret memory addressable over a different number of binary elements. Advantageously, the logic operators are of the equiprobable binary type, such as an EXCLUSIVE OR element.

The wired circuit 30 uses the content of the secret memory 40 for establishing a serial cryptographic function f of two operands, of which the first is a keyword 19 and the second is the output of the internal memory 11.

Advantageously, the keyword is a variable (a random number chosen by the terminal 1) coming from the terminal 1, carried via the communication interface by the input/output line 19 of the card 5.

Thanks to the invention, the observation of several pairs of keywords-transforms obtained by the cryptographic function f does not allow the secrets of the card to be discovered with present day means known to the expert.

The second operand of the logic operator 31 comprises the signature bits S coming from the internal memory 11 via the line 20.

These signature bits S are prestored in the memory 11 and derive from a coding according to another secret cryptographic function H, outside the card and having the output of the internal memory as the operand.

For example, the signature bits S are the transform obtained by the second cryptographic function H of the identification bits i and of the value bits D.

To prevent fraud in the signature bits S, only the identification bits i and the value bits D are exchanged towards the outside, whilst the signature bits S are transmitted solely between the internal memory 11 and the wired circuit 30 which allows the card to be protected from fraud. In point of fact, knowledge of i, D and S would permit a fraudulent manufacture of false cards.

Figure 5:
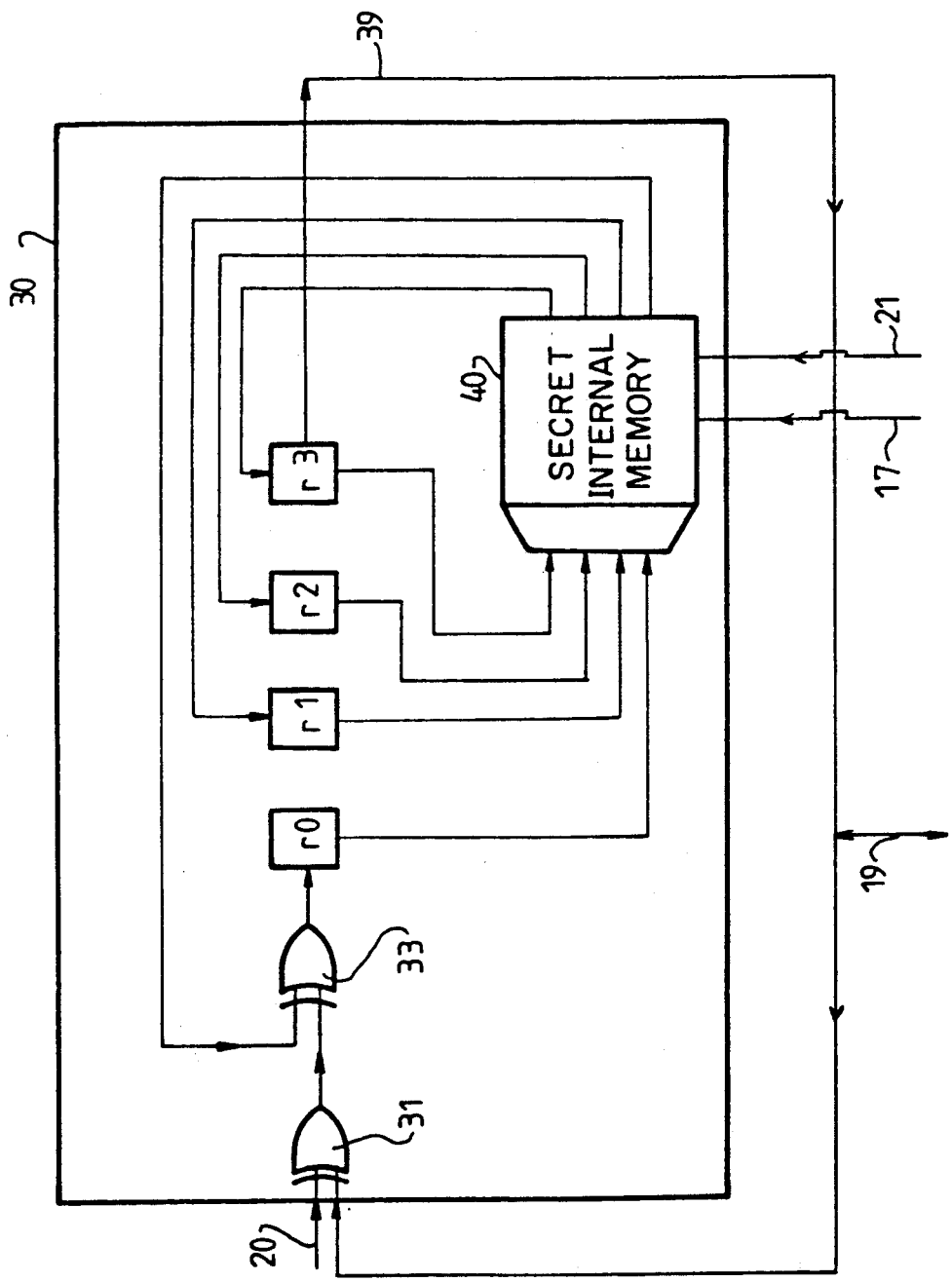
FIG. 5 is a detailed diagram of another example of the operation of the wired circuit making it possible to establish the first cryptographic function in accordance with the invention.

FIG. 5 shows a detailed diagram of another operation of the wired circuit in accordance with the invention.

The four flip-flops R0 to R3 appear again, to form a loop between the outputs and address inputs of the secret memory 40, as well as the two logic operators 31 and 33. On the other hand, the logic operators 51, 59 and 69 are here dispensed with to simplify the interconnections between the flip-flops R0 to R3.

The wired microcircuit card in accordance with the invention is generally intended to cooperate with a terminal with a view to concluding a monetary, financial or commercial type transaction. To protect this transaction against fraud, the invention offers a computerised or remote control validation procedure between at least one terminal and at least one microcircuit card, such as described with reference to FIGS. 1 to 5 and which is capable of cooperating with this terminal.

This computerized validation procedure comprises the following steps:

a) providing the card 5 with a communication interface 7, with an internal memory 11, with a wired processor unit 9 allowing this internal memory 11 to be addressed from the outside, b) making provision in the card for an internal secret memory zone 40 not addressable from the outside;

c) prestoring in the card 5 bits i for identification of the card, value bits D to which there is allocated a unit value that can be used up by writing thereon; and signature bits S of the card;

d) providing the processor unit 9 of the card with a wired circuit 30 capable of using the contents of the secret memory 40 for establishing a first serial cryptographic function f of the two operands;

e) during a validation request for a transaction assumed to be coming from the card, e1) receiving at the terminal the output of the internal memory;

e2) providing the terminal with means capable of generating a keyword;

e3) transmitting the keyword from the terminal;

e4) calculating at the card the transform of the keyword and of the output of the internal memory by the first cryptographic function f;

e5) receiving from the card the transform by the first cryptographic function f;

e6) calculating at the terminal the transform of the keyword and of the output of the internal memory by the first cryptographic function f;

e7) deciding the validation according to the comparison of the transform received from the card and the transform calculated by the terminal.

Reference will now be made to FIG. 6 illustrating the steps e1), e4), e6) of the method in accordance with the invention.

More precisely, part a of FIG. 6, shows the configuration of the card for the step e1) relating to the transmission of the identification bits of the card towards the terminal. This concerns the reading of the memory fields relating to the identification bits i. For example, one is here concerned with reading the memory address fields A0 to A63.

Part b of FIG. 6 shows the configuration of the card in accordance with the invention with reference to the step relating to the transmission of the value bits D to the terminal via the input/output line 19 of the card. This concerns the reading of the memory fields relating to the value bits D stored in the addresses A64 to A191.

Part c of FIG. 6 shows the configuration of the card 5 for the step relating to the calculation of the transform of the keyword and of the output of the internal memory by the cryptographic function f established by the wired circuit 30. This concerns the reading of the signature bits S contained in the memory at the addresses A192 to A255 on the one hand and receiving the keyword coming from the terminal via the input/output line 19 of the card 5.

Part d of FIG. 6 shows the configuration of the card 5 during the step relating to the transmission of the transform obtained by the cryptographic function f towards the terminal via the input/output line 19. This concerns the reading of the transform obtained by the first cryptographic function. This reading is effected at the addresses A256 to A259.

The transform of the keyword and of the output of the internal memory obtained by the cryptographic function f of the wired circuit 30 is received by the terminal. The keyword is, for example, a variable generated by the terminal 64 bits in length, whilst the output of the internal memory is constituted by the signature bits S also extending over 64 bits.

The processing and calculating means 3 of the terminal 1 first calculate the transform by the cryptographic function f of the signature bits S of the card and of the keyword.

The signature bits S have been preestablished by the cryptographic function H by means of the identification bits i and the value bits D previously received by the terminal 1. It should be observed that the signature bits S are never transmitted via the interface means between the card and the terminal. Otherwise, it would be easy for a forger to fraudulently manufacture a false card.

Thereupon, the means 3 compare the transform thus calculated by the cryptographic function f at the terminal with the transform received from the card.

If the two transforms are identical, the calculating and processing means 3 conclude that the card is authentic and approve its validation for a transaction between the card and the terminal.

At the end of the transaction, it is necessary to update the value bits D and the signature bits S. It is not possible for the terminal to send these new values D' and S' of the value bits D and of the signature bits S after the transaction in an unencoded form, since in that case, a user could fraudulently create a copy of the card by intercepting D' and S'.

To overcome this drawback, the invention makes provision for encoding the new value of the signature bits S' in such a way that it can be easily deciphered with wired logic.

In accordance with the invention, the method U for encoding the signature bits S after the transaction is effected by the processing and calculating means 3 of the terminal. More precisely, these processing and calculating means 3 determine first of all the new value of the value bits D' after the transaction, depending on criteria chosen according to the transaction established. Then these processing and calculating means determine the new value of the signature bits S' by means of the second cryptographic function H which now has the operands i and D'. Finally, these processing and calculating means 3 encode this new value of the signature bits S' in such a way that a forger cannot use this value for creating a false card.

According to an important characteristic of the invention, the encoding U of the signature bits S' lies in establishing the EXCLUSIVE OR sum of the old value of the signature bits S on the one hand, and of the new value of the signature bits S' modified according to a circular permutation of a binary element on the other hand.

The circular permutation can be effected to the right or to the left.

The expert will understand that this circular permutation which is not commutative in relation to the EXCLUSIVE OR operator, prevents a forger from deducing the new value of the signature bits S' from the EXCLUSIVE OR sum.

Reference will now be made to FIG. 7 which illustrates the method for encoding the signature bits described above.

In part a of FIG. 7, the identification bits i are written into the internal memory 11 at the addresses A0 to A63.

In part b of FIG. 7, the value bits D' are written into the internal memory 11 at the addresses A 64 at A191.

In part c of FIG. 7 the signature bits S before the transaction are added by means of an EXCLUSIVE OR logic operator 60 accommodated in the control unit 28, to the encoded signature bits U resulting from the EXCLUSIVE OR sum of the signature bits S before the transaction on the one hand, and the signature bits S' after the transaction modified according to a circular rotation of a binary element on the other hand.

A register 62 allows this circular rotation operation to be managed. This operation requires:
a) the reading of the signature bits S before the transaction;
b) the EXCLUSIVE OR summation of the signature bits S before the transaction and the encoded signature bits U coming from the terminal;
c) the retardation by a clock pulse as far as the circular permutation is concerned;
d) the entry of the signature bits S' after the transaction, thus obtained.

The sequencing of this circular rotation operation may be effected by using the rising and descending fronts of the clock pulse 17.

In response to the clock signal 17 and the reading/writing signal 21, the signal 22 actuates the sequencing by positioning the reading mode and then the writing mode of the memory 11, which allows the signature bits S before the transaction to be read and then the signature bits S' after the transaction to be written.

For the operation to be completed, it is necessary when the address register of the memory 11 contains the address A256, that the bit marked in the memory should be the bit of address A192. Thus, the EXCLUSIVE OR sum of the bit S63 representing the signature bit S stored at the address 255 and of the bit U63 representing the encoded signature bit U is stored in the memory zone S'O with the address A192.

The control signals for the memory 11 are governed by the wired logic according to the addresses of the address register of the memory.

In part d of FIG. 7, the new values of bits i, D' and S' are stored in the card after the transaction.

The principles described above relating to the validation or authentication of a wired microcircuit card apply to the use of such a card as an electronic purse. The management of the usable memory zone, that is to say wherein the bits allocated a unit value are stored, can be a management of the binary counter type or of the abacus type, wherein the unit value is equal to a telephone price unit for example. The abacus type management is different from the binary counter type management, wherein the unit value can be equivalent to the dollar and to the cent.

In a memory with an abacus type management, each token is represented by a bit, at 0 if its has not been used up, and at 1 when it has been used up. Various weightings may be allocated to the bits according to their address. It is then possible to render the charging irreversible by only allowing the bits to be written from 0 to 1, which corresponds to their consumption. This is not the case with binary counting where the bits representing the credit of the card pass from 0 to 1 or from 1 to 0, according to the contents of the counter and the amount of the consumption.

The invention makes provision for a card having a wired logic still simpler than the one described above and which takes into account the properties of the memory with an abacus type management mentioned above.

In this variant, the memory comprises bits i for identifying the card over for example 64 bits, value bits D extending over 128 bits having an abacus type management, and signature bits S extending over 64 bits. The signature bits S are determined on the basis of a second cryptographic function H having as operand only the identification bits i instead of two operands i and D as above. Thus at each consumption of price units, there is no need for signature bits to be updated, which simplifies the wired logic by dispensing with the element 60, 62 relating to the updating of S after the transaction, described with reference to FIG. 7.

Nevertheless, the card must, in this variant, verify the access conditions to the memory zones i, D and S. Firstly, the identification bits i can be freely read, written and erased. Secondly, the value bits D can be freely read, whilst it is only their writing from 0 to 1 that is authorized. On the other hand, the erasure of D (corresponding to the writing of the bits from 1 to 0 for the reloading of the card) must not be free. One solution lies in allowing the erasure of D only simultaneously with the erasure of S, thus a forger wishing to reload the card renders it unusable, because he does not know the value of S to be written. This simultaneous erasure of D and of S may extend to a simultaneous erasure of i, D and S.

Thirdly, the signature bits S can only be read, whilst their writing and erasure are free.

A reloading counter (not represented) may be placed into the identification bits, for example a counter of 6 bits for 64 reloading operations. This reloading counter thus allows the number of times the card can be reloaded to be limited. This reloading counter is controlled by the terminal and not by the card.

Nevertheless, the abacus type variant is only feasible if the terminals for reloading the cards are secure, that is to say, a forger must find it impossible to place a sensor between the card and the terminal for detecting the values of the bits i, D and S with a view to creating false cards.

It is, however, possible to restrict this eventuality by prohibiting the rewriting of the identification bits i. Yet, this prevention complicates the wired logic of the card, because the latter must handle personalization or utilization states, unless the identification bits are in a part of the memory that is physically erasable, which would imply the provision of several types of memory in the card.

Another solution lies in making provision for an encoding of the reloading that is independent of the signature bits S. This encoding lies in transforming the value bits D by a third cryptographic function g, known only to the reloading terminals.

The erasure of the value bits D is, in this case, no longer linked to the erasure of the signature bits S. The terminals for reloading the card only have to know the third cryptographic function g without knowing the second cryptographic function h.

Figures 8A, 8B, 8C, 8D:
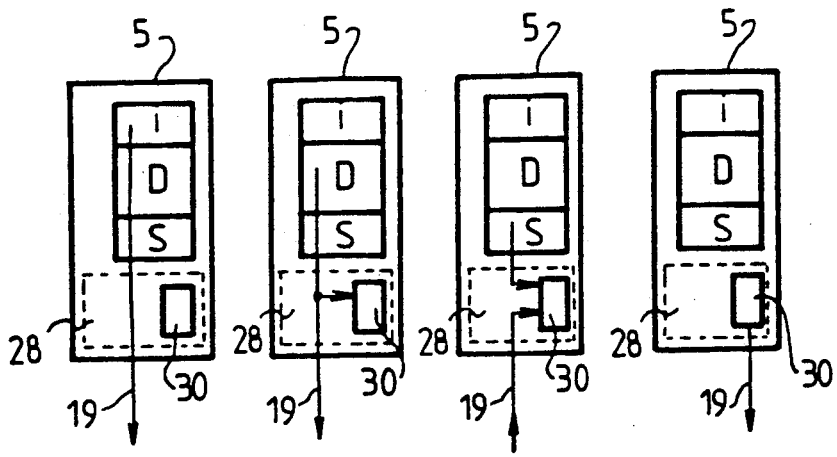
FIGS. 8a to 8d illustrate the steps relating to the validation of a card provided with an EPROM memory before the transaction.

Reference will now be made to FIG. 8 which illustrates the steps of the variant of the method in accordance with the invention with an abacus type memory.

More precisely, part a of FIG. 8 shows the configuration relating to the transmission of the identification bits i from the card towards the terminal. This concerns the reading of the memory fields with addresses A0 to A63.

Part b of FIG. 8 shows the configuration of the card with reference to the transmission of the value bits D to the terminal via the input/output line 19, as well as the introduction of the value bits D into the wired circuit 30 by means of the serial line 20. This concerns the reading of the memory fields relating to the value bits D stored at the addresses A64 to A191.

Part c of FIG. 8 shows the configuration of the card with reference to the introduction of the keyword into the wired circuit 30 via the input/output line 19 and of the signature bits S via the line 20. This concerns the reading of the signature bits S and of the keyword. This reading is effected at the addresses A192 to A255.

Part d of FIG. 8 shows the configuration of the card with reference to the calculation of the transform by the cryptographic function f of the bits D, S and of the keyword. This transform is then transmitted to the terminal via line 19.

Here the cryptographic function f is established by means of the keyword, the value bits D and the signature bits S. The operation of this cryptographic function f does not modify the wired logic described above insofar as the value bits D are introduced in series into the wired circuit 30 via the serial input 20 with the signature bits S.

The introduction of the value bits D into the cryptographic function f is necessary to prevent fraud constituted by designing a copy of the card by means of a microprocessor and a portion of the wired logic of the card. In fact, in the case of this fraud, the microprocessor receives the signals from the terminal, whilst it relies on the part of the wired logic for effecting the calculation of the transform by the cryptographic function f with the keyword and the signature bits S as the operands. This fraud is prevented when the terminal effects the authentication of the card before and after the updating of the value bits D at D' by means of the keyword, the signature bits S and the value bits D.

Figure 9:
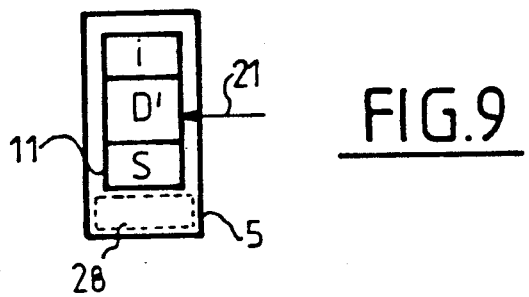
FIG. 9 illustrates the step relating to the using up of the value bits of an EPROM memory.

Reference will now be made to FIG. 9 which represents the configuration of the card during the consumption of the value bits during the transaction. This concerns the writing of the bits to 1, controlled by the writing/reading line 21. The bits are written to 1 at the addresses A64 to A191.

Figures 10A, 10B, 10C, 10D, 10E:
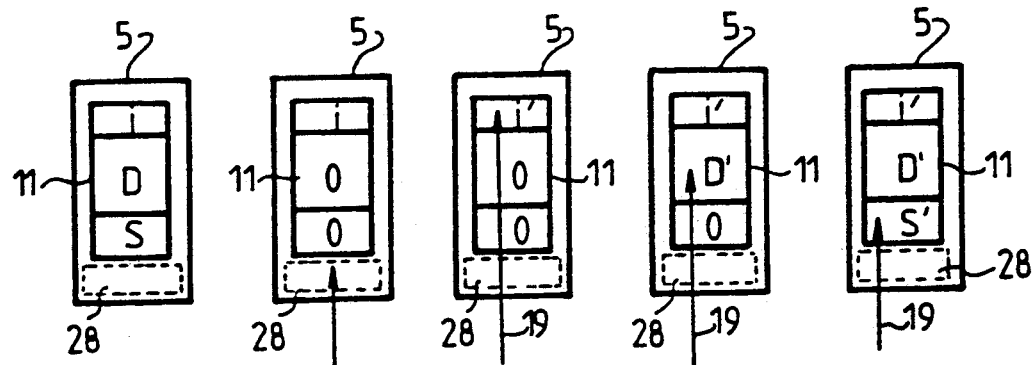
FIGS. 10a to 10e illustrate the step relating to the reloading of the memory of an EPROM card.

Reference will now be made to FIG. 10 which represents the configuration of the card during erasure (FIG. 10b) and reloading of the card (FIGS. 10c to 10e).

In part b of FIG. 10, the memory bits are erased (written to 0).

In part c of FIG. 10, the identification bits i' after reloading are written into the memory 11 at the addresses A0 to A63. The identification bits i' after reloading comprise in addition, the incrementation of the reloading counter.

In part d of FIG. 10, the value bits D' are written into the memory at the addresses A64 to A191. The value bits D' correspond to the reconstituted value whereto there is added the previous balance.

In part e of FIG. 10, the signature bits S' are written into the memory at the addresses A192 to A255. The signature bits S' are established by means of the cryptographic function H' whose operand is here formed by the identification bits i.

The variant relating to a memory with an abacus type management described with reference to FIGS. 8 to 10 is suitable for EPROM type memory cards.

The value bits D and the signature bits S can be updated as the consumption of the value bits proceeds according to chosen criteria of the transaction. For example, this updating termed "with the flow" is made necessary when the user is able to withdraw the card at any time. Another method lies in updating only the D bits with the flow, that is to say, that only some bits are concerned in the case of tokens. At the end of the communication, it is then necessary to update the value bits D and the signature bits S. Thus a premature withdrawal renders the card unusable.

Another variant of the invention relating to a memory with a binary counter type management makes provision for the irreversible updating of the value bits D.

In this other variant, the value bits D contain the balance of the transaction written in the binary mode. The terminal reads the value bits D as described above.

The terminal 1 checks that the credit D of the card is greater than the amount m to be used up.

Figure 11:
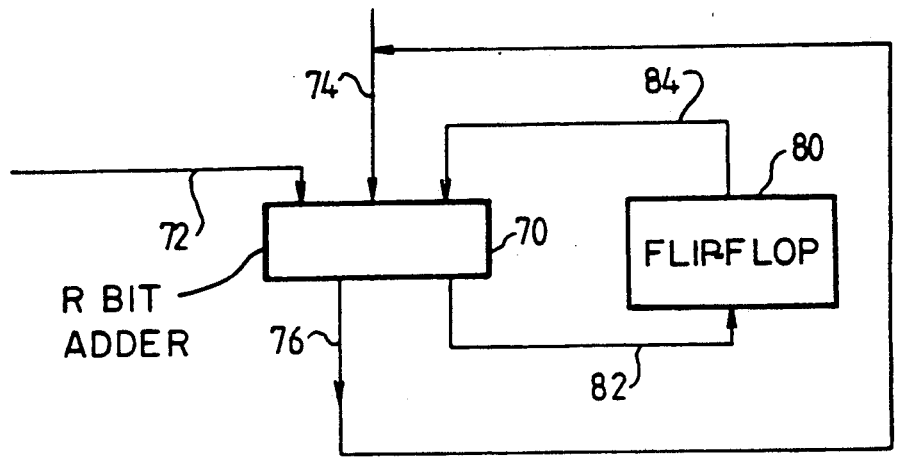
FIG. 11 is a detailed diagram of a mechanism for calculating the value bits in accordance with the invention, whilst

In the consumption stage, instead of directly writing the new bits after the transaction, into the value bits D, the terminal this time presents the amount m to be used up to the card (FIG. 11). A 1-bit adder 70 accommodated in the control unit 28 receives the amount m coming from the terminal at its first input 72. At its second input 74, the adder 70 receives the value bits D coming from the memory 11. The adder 70 performs the operation D - m, bit by bit. The output 76 of the adder 70 delivers the result of this operation which is stored in the memory zone allocated to the value bits D.

If the result of the operation D - m is negative, it is necessary to provide an indicator which must be positioned in the memory of the card, and which indicates that the credit is used up.

This indicator (not shown), is for example, stored in the memory 11 via a flip-flop 80 forming a loop between the output 82 of the adder 70 and the input 84 of the said adder. The flip-flop 80 is controlled by the clock signal of the card.

If such a card is reloaded, the indicator is reset to zero. For the sake of security, the erasure of this indicator is linked exclusively to that of the signature bits S.

Figure 12:
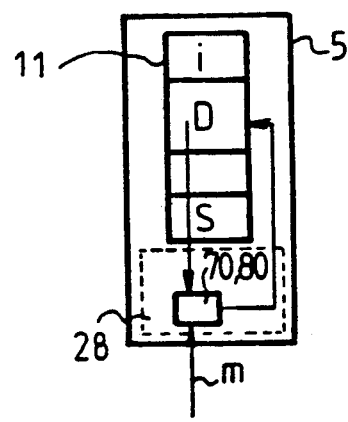
FIG. 12 illustrates the step relating to the said calculation.

In FIG. 12, the configuration of the card has been represented with reference to the updating of the value bits D of a memory with a binary counter type management.

This other variant of the invention is only suitable for EEPROM type memory cards.

The binary content of the secret memory 40 described in the invention is common to all the cards. The content of the memory may, of course, differ according to the cards and their applications.

We claim:

1. A microcircuit card, comprising:
   communication interface means (7);
   first internal memory means (11) having an output (20);
   second (40) internal memory means;
   wired circuit means (30) capable of using the contents of said second internal memory means (40) for establishing a first serial cryptographic function of two operands; and
   logic control means responsive to interrogation of predetermined addresses of said first internal memory means (11) accompanied by a keyword (19) for applying said keyword (19) and the output (20) of the first internal memory means as operands of the wired circuit means (30), respectively, and for applying an output of the wired circuit means (30) to said communication interface means (7).

2. A microcircuit card according to claim 1, wherein said wired circuit means includes:
   a) a first logic operator (31) having two inputs which respectively receive the keyword (19) and the output of said first internal memory means (20), and an output (35); and
   b) a retardation logic circuit having input means (32), output means 42, and retardation means forming a loop between outputs and inputs of the second internal memory means (40), said input means (32) receiving respectively the output (35) of the first logic operator (31) and the outputs (38) of the retardation means, said output means (42) having inputs which respectively receive the outputs (38) of the retardation means, and an output (39) which provides the output of the wired circuit.

3. A card according to claim 2, wherein said input means of the retardation logic circuit comprise a second logic operator receiving on the one hand the output of the first operator and on the other hand an output of said retardation means, and wherein at least said second operator is of the binary equiprobable type, such as an EXCLUSIVE OR element.

4. A card according to claim 3, wherein said retardation means comprise a plurality of loop-mounted flip-flops between the outputs and the address inputs of the secret memory, at least one of said loop-mounted flip-flops receiving the output of said second logic operator the second logic operator itself receiving on the one hand the output of the first operator and on the other hand an output of the secret memory, whilst one of said flip-flops provides the output of the wired circuit.

5. A card according to claim 3, wherein said first and second logic operators are both of the EXCLUSIVE OR type.

6. A card according to claim 1, wherein said keyword is a variable coming from said communication interface means.

7. A card according to claim 1, wherein said internal memory means comprises:
   identification bits of the card;

value bits to which there is assigned a unit value that is consumable by writing thereon; and
signature bits of the card.

8. A card according to claim 7, wherein said signature bits introduced into said internal memory means are the result of an encoding by a second secret cryptographic function externally from the card, and having the output of the internal memory means as the operand.

9. A card according to claim 7, wherein said signature bits introduced into said internal memory means are the result of an encoding by a second cryptographic function externally of the card, and having the identification bits and value bits as operands.

10. A card according to claim 1, wherein said first internal memory means is a memory with a permanent EPROM type electrically non-erasable entry mode.

11. A card according to claim 1, wherein said first internal memory means is a memory with a permanent EEPROM type erasable and electrically renewable entry mode.

12. A card according to claim 1, wherein the secret memory is a permanent-entry memory.

13. A card according to claim 1, wherein the secret memory is a permanent-entry memory of the PROM type having a fixed binary content.

14. In a method for transactions between at least one terminal and at least one wired microcircuit card capable of cooperating with this terminal, the improvement comprising the following steps:
   a) providing the card:
      with communication interface means,
      with internal memory means,
      with a wired processor unit allowing said internal memory means to be externally addressed;
   b) making provision in the card for an internal memory zone not externally addressable;
   c) prestoring in the card:
      identification bits of the card
      value bits to which there is allocated a unit value that can be used up by writing thereon; and
      signature bits of the card;
   d) providing the processor unit of the card with a wired circuit capable of using the contents of the internal memory zone for establishing a first serial cryptographic function of the two operands;
   e) during a validation request for a transaction assumed to be coming from the card,
      e1) receiving at the terminal the output of said internal memory means;
      e2) providing the terminal with means capable of generating a keyword;
      e3) transmitting the keyword from the terminal;
      e4) calculating at the card the transform of the keyword and of the output of said internal memory means by the first cryptographic function;
      e5) receiving from the card said transform by the first cryptographic function;
      e6) calculating at the terminal the transform of the keyword and of the output of said internal memory means by the first cryptographic function; and
      e7) deciding the validation according to the comparison of the transform received from the card and the transform calculated by the terminal.

15. A method according to claim 14, wherein; in the card, the signature bits serve together with the keyword as the operands for the first cryptographic function.

16. A method according to claim 14, wherein the signature bits introduced into the card are the transform of a second cryptographic function externally of the card, and having the output of said internal memory means as the operand.

17. A method according to claims 14, and further including the step of providing the terminal with means capable of executing a second cryptographic function having the output of the internal memory as operand, whilst during a validation request for a transaction, said step e1) includes, moreover, the step formed by calculating at the terminal the signature bits together with the transform of the output of the internal memory by the second cryptographic function; and wherein step e6) comprises calculating at the terminal the transform of the first cryptographic function having as operands the keyword and the transform of the second cryptographic function, that is to say the signature bits thus calculated by the terminal.

18. A method according to claim 14, wherein the wired microcircuit card holds at least value bits having a predetermined value, intended to be processed by the terminal to validate the transaction according to chosen criteria, and wherein said method comprises the following steps after the transaction has been concluded:
   a) obtaining at the terminal the value bits after the transaction;
   b) comparing at the terminal the value bits after the transaction with the value bits before the transaction;
   c) if the value bits after the transaction exceed the value bits before the transaction, calculating at the terminal the transform of the identification bits and of the value bits after the transaction by the second cryptographic function;
   d) displacing the transform thus calculated by the second cryptographic function by a binary element according to a circular permutation;
   e) obtaining an intermediate encoded signal by the EXCLUSIVE OR sum of the transform obtained by the second cryptographic function calculated before the transaction and of the transform by the second cryptographic function calculated after the transaction and itself displaced according to the circular permutation;
   f) transmitting from the terminal the value bits after the transaction;
   g) transmitting from the terminal the said intermediate encoded signal;
   h) entering into the memory the value bits after the transaction;
   i) storing in the card the EXCLUSIVE OR sum of the signature bits before the transaction and of the intermediate coded signal;
   j) entering into the memory the signature bits after the transaction by means of the said EXCLUSIVE OR sum thus stored.

19. A method according to claim 14, for updating of the value bits after the transaction, and further comprising:
   a) transmitting from the terminal the bits representing the amount of the transaction;
   b) comparing the bits representing the amount with the value bits;
   c) subtracting the bits representing the amount from the value bits; and
   d) positioning an indicator according to the subtraction sign.

20. A method according to claim 14, wherein each value bit is associated with a unit value variable according to the weighting of the bit, and wherein the value bits are used up by an irreversible entry from 0 to 1.

21. A method according to claim 20, wherein step e4) lies in calculating at the card level the transform by the first cryptographic function of the keyword as the first operand, and of the value bits and of the signature bits as the second operand in series.

22. A method according to claim 14 wherein, in the event that the value bits are used up, wherein it comprises the following steps:
   a) setting to zero the identification bits, the value bits and the signature bits before the reloading;
   b) incrementing a reloading counter; and
   c) reloading the new identification bits, the value bits and the signature bits into the card.

23. A method according to claim 14, wherein the value bits are encoded by a third cryptographic function specific to the card.

24. A method according to claim 23 wherein, in the event that the value bits are used up, wherein it comprises the following steps:
   a) setting the identification bits and the value bits to zero before the reloading.
   b) incrementing a reloading counter; and
   c) reloading the identification bits and the value bits after the reloading.

25. A wired microcircuit card according to claim 1, for implementing the method according to claim 18, and further including:
   an EXCLUSIVE OR operator having a first input receiving the signature bits before the transaction and a second input receiving the encoded signal, and
   a storage register having an input connected to the output of the EXCLUSIVE OR operator and an output connected to the output of said internal memory means.

26. A wired microcircuit card according to claim 1, for the implementation of the method according to claim 19, and further including:
   an adding operator having a first input receiving the bits representing the sum of the transaction coming from the terminal, a second input connected to the output of said internal memory means and a first output connected to the output of said internal memory means; and
   a holding flip-flop forming a loop between the inputs and outputs of the adding operator.

27. A wired microcircuit card according to claim 1, for the implementation of the method according to claim 21, wherein the value bits are encoded by a third cryptographic function specific to the card.

28. A wired microcircuit card according to claim 1, for the implementation of the method according to claim 22, wherein said internal memory means includes a reloading counter.

* * * * *